No. 872,690. PATENTED DEC. 3, 1907.
C. F. SCHNOOR.
FAN.
APPLICATION FILED AUG. 19, 1907.

2 SHEETS—SHEET 1.

Witnesses:
John Enders
Ralph Schaefer

Inventor:
Christian F. Schnoor,
By Dyrenforth, Lee, Chritton & Wiles
Attys

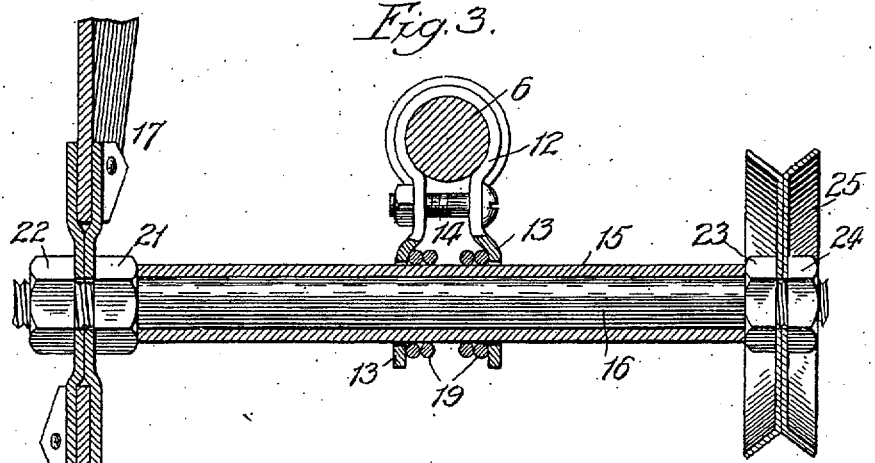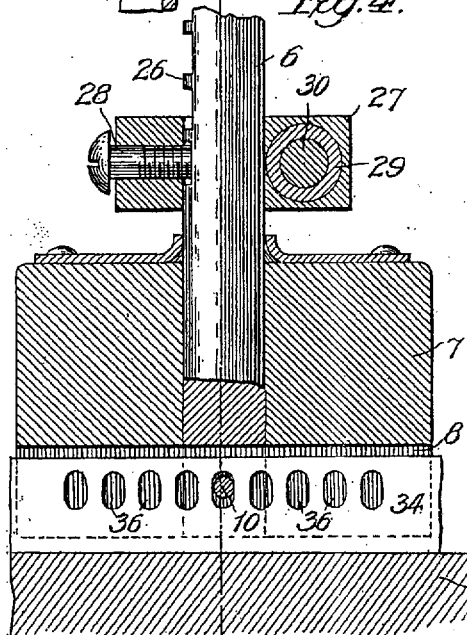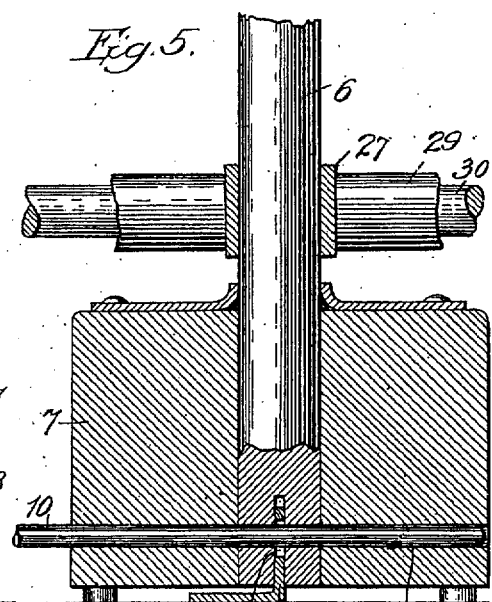

UNITED STATES PATENT OFFICE.

CHRISTIAN F. SCHNOOR, OF CHICAGO, ILLINOIS.

FAN.

No. 872,690.

Specification of Letters Patent.

Patented Dec. 3, 1907.

Application filed August 19, 1907. Serial No. 389,112.

*To all whom it may concern:*

Be it known that I, CHRISTIAN F. SCHNOOR, a citizen of the United States, residing at 237 West One Hundred and Seventeenth street, Chicago, in the county of Cook and State of Illinois, have invented a new and useful Improvement in Fans, of which the following is a specification.

My invention relates to an improvement in the class of rotary fans in common use for cooling the atmosphere in a room; and my object is to provide a novel construction of portable fan in the class referred to, whereby it shall be adapted to be geared, for driving it, to any convenient motive power, whether foot-power, an electric or a gasolene motor, or the like, and whereby it shall be rendered readily adjustable with reference to the motor and also to the object to be cooled.

Figure 1:
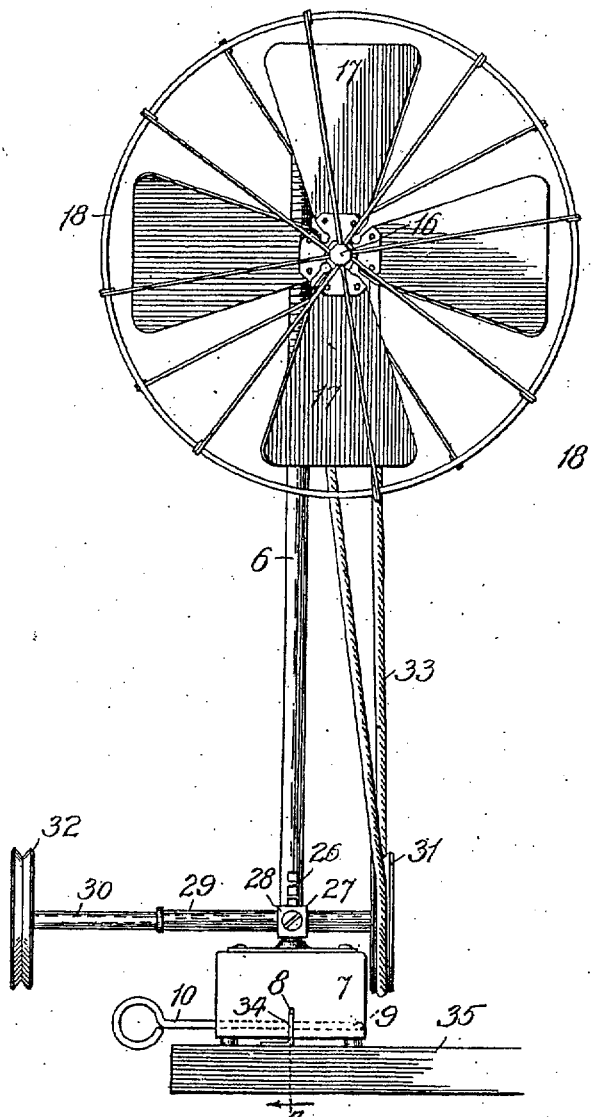
Figure 2:
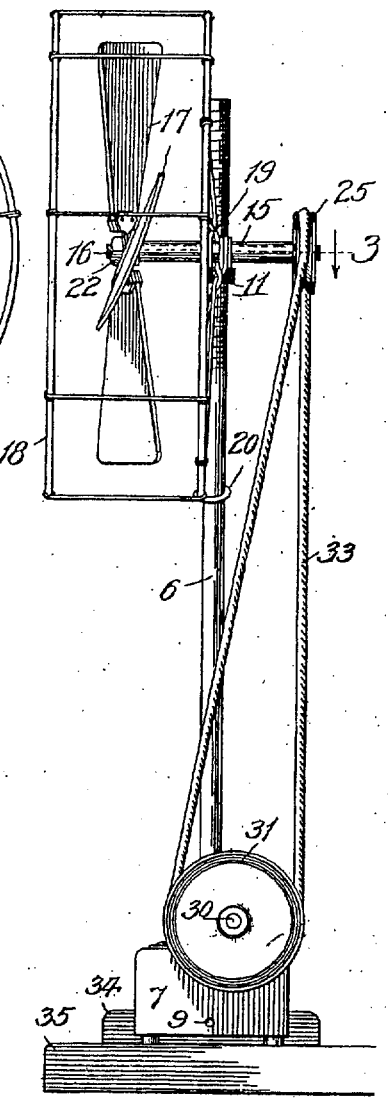

In the accompanying drawings, Figure 1 shows my improved fan by a view in front elevation, adjustably supported on a suitable bed; Fig. 2 shows the same by a view in side elevation; Fig. 3 is an enlarged section taken at the line 3 on Fig. 2 and viewed in the direction of the arrow; Fig. 4, an enlarged section taken at the line 4 on Fig. 1 and viewed in the direction of the arrow, and Fig. 5, an enlarged section taken at the line 5 on Fig. 4 and viewed in the direction of the arrow.

A post 6, which may be a metal rod and which is threaded about its upper-end portion, rises from a supporting base 7, shown as a rectangular block, preferably of hard wood, provided in its bottom, for the purpose hereinafter described, with a transverse slit 8 and with a perforation 9 extending through it at right angles to the slit to receive a removable pin 10. On the threaded upper end of the post is screwed a nut 11 forming a stop-seat for a flanged collar 12 rotatably surrounding the post and through the flanges of which, forming lips 13, a bolt 14 is passed, near their junction with the collar to clamp it about the post. The lips 13 form a bearing for a metal sleeve 15 rigidly confined in them and in which is rotatably confined the fan-shaft 16 carrying on one projecting end the fan 17 formed of blades in the ordinary manner, and enveloped in the usual circular wire cage 18, which is rotatably supported on the post by twisting its back-forming wires about the sleeve 15 between the lips 13, as shown at 19 and looping about the post the annular back-wire of the cage as shown at 20 (Fig. 2).

The fan is fastened in place between nuts 21 and 22 on the respective end of the fan-shaft, which carries on its opposite projecting end, also confined between nuts, 23 and 24, thereon a peripherally grooved pulley 25, which may be best formed of two sections, as indicated, stamped out of sheet metal and clamped together by the nuts.

In one side of the post near the base 7 is provided a vertical series of stop-teeth 26 about which the post is surrounded by a vertically adjustable rectangular collar 27 rigidly supported in adjusted position by a set-screw 28 working in one end of the collar against the post and seating at its inner end on one or another of the teeth 26. A metal sleeve 29 passes through and is rigidly secured in the opposite end of the collar 27, to extend transversely of the post, and forms the bearing for a rotary shaft 30 for driving the fan, and carrying on its opposite ends similar pulleys 31 and 32, like but larger than the pulley 25 and similarly fastened in place, the pulley 31 being connected with the pulley 25 by an endless belt 33.

This fan-device is provided as a portable article more particularly for household or work-room use, and to that end is devised to adapt it to be placed in any position that is most convenient or desirable, as on a stand or the table of a sewing-machine to bring it into close proximity to the operator of the machine. To facilitate thus placing the fan I provide, as an adjunct to go with it, a thin metal clip 34 formed with a flat base-section adapted to be screwed down firmly upon a support 35, as a stand or table, and an upright section or flange containing a longitudinal series of perforations 36 and adapted to fit in the slit 8 provided in the bottom of the base 7. To seat the fan-device its base is placed to introduce the upright flange of the clip into the slit and register a hole 36 with the hole 9 in the base, to permit the pin 10 to be passed through bolt holes (as also through the post, likewise provided with a transverse hole registering with the hole 9) to fasten the device in position.

For operating the fan, the pulley 32 is adapted to be geared in any suitable manner with any suitable motor, preferably with one, like a power-operated sewing-machine, an electric or other motor, that is operated continuously with the advantage of continuously working the fan for the benefit of its uninterrupted cooling action. The adjustability of the device on the clip 34 adapts it to take up slack in the driving-belt (not shown) on the pulley 32, and this same purpose is subserved in another direction by the provision for raising and lowering the shaft 30 on the post through the medium of the collar 27 and stop-supported set-screw 28. A further important advantage of the construction is due to the adjustability of the fan and its cage by turning them on the post, whereby the fan may be quickly and conveniently directed to any desired point. Moreover, on loosening the collar 12, it may be raised or lowered, with the fan and cage, and supported by properly turning the nut 11, to adjust the fan accordingly or take up slack in the belt 33.

What I claim as new and desire to secure by Letters Patent is—

1. A portable fan-device comprising, in combination, a post rising from a base and having a threaded upper section with a nut screwed thereon, a collar rotatably clamped about said post-section and provided with lips forming a sleeve-bearing, a sleeve secured in said bearing to extend across the post, a shaft journaled in said sleeve and carrying a fan, a cage secured on said sleeve to envelop the fan, and a drive-shaft rotatably supported on the lower part of the post and geared to said fan-shaft.

2. A portable fan-device comprising, in combination, a base containing a slit in its under side and a pin-hole crossing said slit, a clip adapted to be fastened on a support and having an upright flange adapted to enter said slit and provided with a series of holes adapted to register with said pin-hole, a post rising from said base, a fan on a rotary shaft supported on the upper part of the post, and a drive-shaft rotatably supported on the lower part of the post and geared to the fan-shaft.

3. A portable fan-device comprising, in combination, a post rising from a base and provided near the base with a series of stop-teeth, a fan on a rotary shaft supported on the upper part of the post and carrying a belt-pulley, a collar surrounding the post at said stop-teeth and having a set-screw in one end to engage the post, a sleeve secured to said collar to extend across the post, and a drive-shaft journaled in said sleeve and carrying on one end a pulley having a belt-connection with said pulley on the fan-shaft and on its opposite end a pulley adapted to be geared to the driving-power.

CHRISTIAN F. SCHNOOR.

In presence of—
RALPH A. SCHAEFER,
W. T. JONES.